United States Patent [19]

Tan

[11] Patent Number: 4,916,795

[45] Date of Patent: Apr. 17, 1990

[54] METHOD FOR MENDING A DENT ON A MEMBER MADE OF ALUMINUM ALLOY

[75] Inventor: Ryou Tan, Saitama, Japan

[73] Assignee: Honda Giken Kogyo Kabushiki Kaisha, Tokyo, Japan

[21] Appl. No.: 299,033

[22] Filed: Jan. 23, 1989

[30] Foreign Application Priority Data

Jan. 20, 1988 [JP] Japan .................................. 63-8533

[51] Int. Cl.$^4$ .............................................. B23P 6/04
[52] U.S. Cl. .............................. 29/402.18; 29/527.2; 427/142
[58] Field of Search .............. 29/402.18, 527.2, 527.4; 427/142

[56] References Cited

U.S. PATENT DOCUMENTS

| | | | |
|---|---|---|---|
| 3,711,310 | 1/1973 | Leeper, Jr. ........................... | 427/142 |
| 3,873,475 | 3/1975 | Pechacek et al. ................... | 427/142 |
| 4,112,141 | 9/1978 | Yoshida et al. ..................... | 29/402.18 |
| 4,148,122 | 4/1979 | Phillips et al. ..................... | 29/402.18 |
| 4,358,884 | 11/1982 | Harvey et al. ...................... | 427/142 |
| 4,493,451 | 1/1985 | Clark et al. ........................ | 29/402.18 |

Primary Examiner—P. W. Echols
Attorney, Agent, or Firm—Lyon & Lyon

[57] ABSTRACT

An improved method for mending a dent formed on a smooth outer surface of a member made of aluminum or an aluminum alloy. A solder plating layer is effected on the surface of the dent using a low-temperature solder for aluminum. Then, a solder plating is effected on the plating layer using a low-temperature solder. Subsequently, build up soldering is carried out on the plated surface of the dent to be mended using a high-temperature solder. Preferably, the surface of the build-up high-temperature solder layer is ground and polished, and then the ground surface is subjected to a finishing treatment using putty.

2 Claims, 2 Drawing Sheets

METHOD FOR MENDING A DENT ON A MEMBER MADE OF ALUMINUM ALLOY

BACKGROUND OF THE INVENTION

The field of the present invention relates to a method for mending a dent formed on a smooth outer surface of an aluminum alloy member which detracts from the appearance of the member, and more particularly, to a preferred method for mending the member when rectification of the dent from the backside of the member is difficult.

Generally, when a dent is formed on the body panel of an automobile an external force, a sheet metal working process is effected to hammer out the dent and recover, as close as possible, the original shape of the body panel. Once this has been achieved the dent remaining on the outer surface of the member is filled with putty to obtain a smooth outer surface. In some cases, however, the sheet metal working process cannot be applied because an associated member (an inner member) is positioned behind or attached to the back side of the body panel (an outer panel) in such a way that it encloses the space that exists there. This problem can be dealt with through a build up soldering process. The methods for mending a panel made of steel and a panel made of aluminum alloy through the build up soldering process are shown in the flow charts illustrated in FIGS. 1 and 2, respectively.

Soldering of aluminum alloy (throughout this specification, the term "aluminum alloy" should be defined to also include aluminum) is difficult as compared to soldering of other metals such as steel or the like due to the fact that an oxide coating film is liable to be formed on the surface of the base member. Therefore, it is a common practice to perform the soldering inside a furnace while maintaining a non-oxidizing atmosphere therein. In addition, the solder (brazing material) used in soldering of JIS 5000-series and 6000-series aluminum alloys has a high melting point (400° C.–650° C.). Hence these aluminum alloys cannot be soldered using the conventional process, but must be soldered using the TIG arc-welding process as shown in FIG. 2.

Both the method of effecting soldering within a furnace and the method of effecting soldering using the TIG arc-welding process, require a special installation. That is, in the former method, if the size of the object is large, a large furnace is required, while in the latter method, at least two other shortcomings exist: ① as the quantity of heat injected into the base member increases, not only does the thermal strain in the base member increase detracting from the appearance of the member but, in addition, the crystalline grains in the base member grow coarser reducing its rigidity and ② the thickness of the build up soldering has a limit of about 2 mm, while the thickness of the putty has a limit of about 3 mm, and hence, in the event that the depth of the dent in the base member exceeds 5 mm, the dent cannot be dealt with through this method.

Thus mending the dent on an aluminum alloy member by build up soldering cannot easily be achieved using the prior art method.

SUMMARY OF THE INVENTION

It is therefore one object of the present invention to provide a novel method for mending a dent formed on a smooth outer surface of an aluminum alloy member which does not require any special installation, and which can form a highly reliable build up soldering layer to fill up the dent using solder for steel members without the built up solder layer peeling off and/or cracking.

The aforementioned object can be achieved by effecting a solder plating on the surface of the dent using a low-temperature solder for aluminum, then effecting a solder plating on the plating layer using a conventional low temperature solder (solder applicable to mild steel, copper and the like), and subsequently carrying out build up soldering on the plated surface of the dent using a high-temperature solder (solder applicable to mild steel, copper and the like).

Some of the known low temperature solders for aluminum include Sn-Pb series solder (for example, 34Sn-63Pb-3Zn), Sn-Zn series solder (for example, 91Sn-9Zn) and the like containing a minute amount of additive elements such as Cd, Bi, Cu Al, Sb, etc. A recommended low-temperature solder for aluminum is MAGNA 51 (Trade name) manufactured by Magna Corporation, Australia (Melting Temperature: 179° C.). A solder plating is effected by building up thin layers of low temperature solder for aluminum in the dent on the aluminum alloy member by employing a flux for low-temperature use.

As a flux for low-temperature use, it is recommended to use, for instance, the amine group organic flux. This flux has the following characteristics: ① chloride is not contained in this flux, ② the residual flux will not corrode the base member, ③ the levels of reaction and corrosion resulting from an oxide coating film on the base member are low, and ④ the flux is carbonized when it has been heated to a high temperature (available temperature: 270° C. or lower). In order to deal with the third characteristic, that the reaction with an oxide coating film on the base member is small, it is only necessary to remove the oxide coating film on the surface of the base member prior to execution of the solder plating.

The solder plating layer is produced by means of a low-temperature solder for aluminum. A second layer of solder plating is then effected using a conventional low-temperature solder. For this low-temperature solder, it is recommended to use, for example, JIS A.H50 material (Sn 50 wt%, solid phase line temperature 183° C., liquid phase line temperature 215° C.).

Once the second layer of solder plating has been obtained, the build up soldering process can be applied similar to the way the process is applied to a steel member. This build up soldering is effected using a conventional high-temperature solder. For this high-temperature solder, it is recommended to use, for example, JIS H.10A material or JIS H.10B material (Sn 10 wt%, solid phase line temperature 263° C., liquid phase line temperature 301° C.).

Once the dent formed on the surface of an aluminum alloy member has undergone the build up soldering procedure, the built-up solder portion is ground and polished. Thereafter, putty is used to fill the dent to obtain a smooth outer surface (See FIG. 3). According to the above-mentioned method of the present invention, mending a dent of about a maximum of 10 mm in depth is possible.

The above-mentioned and other objects, features and advantages of the present invention, taken in conjunction with the accompanying drawings, will become more apparent by reference to the following description of one preferred embodiment of the invention taken in conjunction with the accompanying drawings.

BRIEF DESCRIPTION OF THE DRAWINGS

FIG. 4 shows a dented panel, while FIG. 5 shows a cross-sectional view taken along line V—V in FIG. 4 to show the condition of the dent build up undergoing the procedure.

DESCRIPTION OF THE PREFERRED EMBODIMENT

Figure 1:
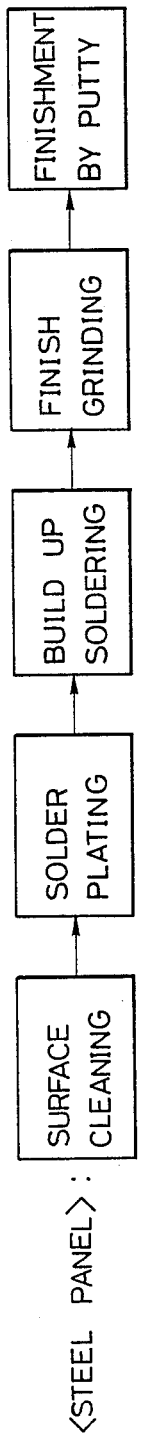
FIG. 1 is a flow chart showing a process for mending a dent a surface of the steel member using a build up soldering procedure known in the prior art.
Figure 2:
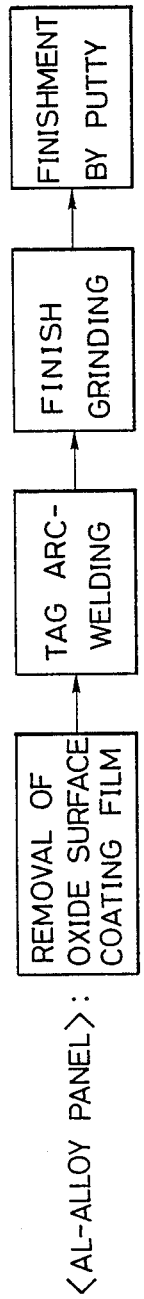
FIG. 2 is a flow chart showing a process for mending a dent the surface of an aluminum alloy member using a build up soldering procedure known in the prior art.
Figure 3:
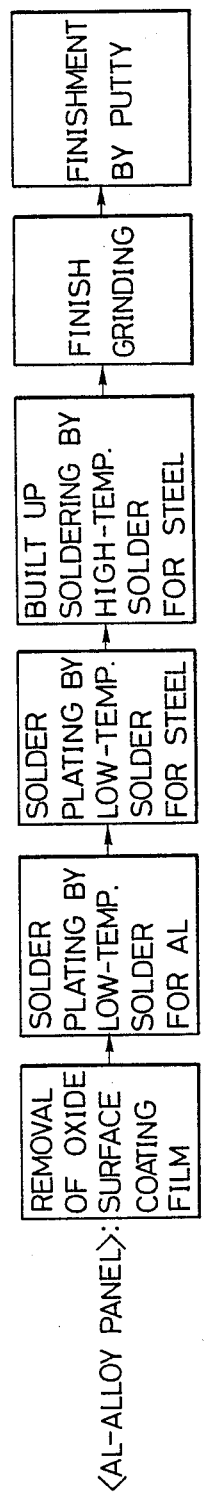
FIG. 3 is a flow chart showing a process for mending a dent on the surface of an aluminum alloy member using the build up soldering procedure taught by the present invention.
Figure 4:
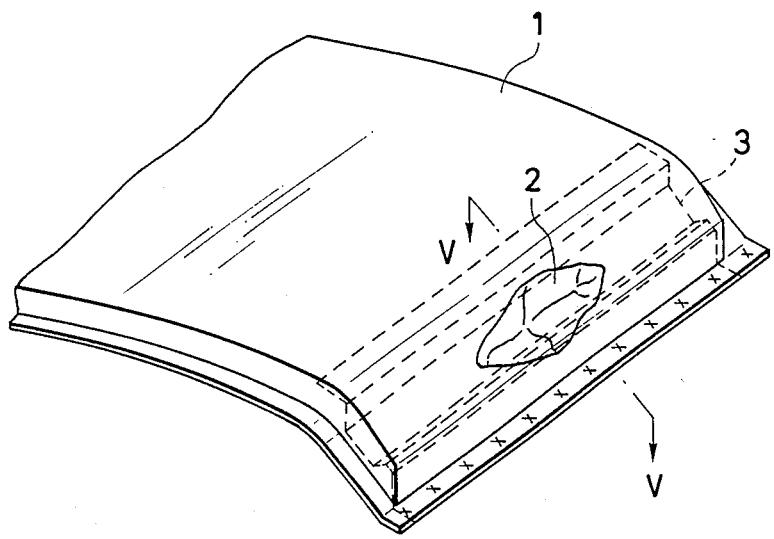
FIGS. 4 and 5 are perspective and cross-sectional views, respectively, showing one example of the method for mending a dent on an aluminum alloy panel according to the present invention. specifically
Figure 5:
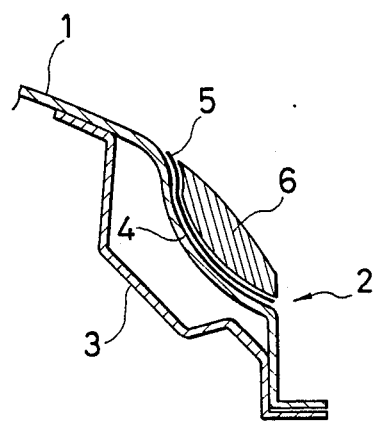

Turning in detail to the drawings, FIGS. 4 and 5 illustrate a mode of mending a dent on a vehicle body panel 1 made of an aluminum alloy such as an outer plate for example (a roof plate) of an automobile. An Associated member 3 is attached to the rear or back side of the vehicle body panel 1. A dent 2 is present on the outer surface of the vehicle body 1 at a location just opposite the associated member 3. This dent 2 is filled with a build-up of solder having a three-layer structure. More particularly, the first layer is a plating layer 4 of low-temperature solder for aluminum, the second layer is a plating layer 5 of conventional low-temperature solder, and the third layer is a build up layer 6 of conventional high-temperature solder. The surface of the build up layer 6 of high-temperature solder is subjected to a finishing treatment whereby the surface is ground and polished, and then covered with putty to provide a smooth outer surface.

In the illustrated embodiment, the plating layer 4 of low-temperature solder for aluminum was formed using MAGNA 51 (the amine group organic flux) referred to above, the plating layer 5 of the low-temperature solder was formed using the JIS A. H50 material, and the build up layer 6 of the high-temperature solder was formed using the JIS H. 10A material. An adhesive force (a tensile strength) of 3 kgf/mm$^2$ on the build up layer can be attained.

As is apparent from the above description, a method for mending a dent on an aluminum alloy member has been proposed. This method is characterized by the steps of effecting a first solder plating layer on the surface of the dent using a low-temperature solder for aluminum, then effecting a second solder plating on the first solder plating layer using a conventional low-temperature solder, and subsequently carrying out the build up soldering procedure using a high-temperature solder.

According to the proposed method, no special installation nor skilled technique is required thereby allowing a dent to be easily mended. Furthermore, a highly reliable built-up solder layer can be obtained using a solder for steel members. Thus, an important practical advantage of the method according to the present invention is disclosed.

Since many changes and modifications that would be apparent to those skilled in the art can be made to the above-described embodiment, it is a matter of course that all matter contained in the above description and illustrated in the accompanying drawings should be recognized as one illustration of the present invention.

What is claimed is:

1. A method for mending a dent formed on an outer surface of a member made of an aluminum alloy comprising the steps of effecting a first solder plating on the surface of said dent using a low-temperature solder for aluminum, effecting a second solder plating on said plating layer using a low-temperature solder, and subsequently effecting a built-up high temperature solder layer on the plated surface of said dent using a high-temperature solder.

2. A method for mending a dent as claimed in claim 1, further comprising the additional steps of grinding the surface of the built-up high-temperature solder layer, and then subjecting the ground surface to a finishing treatment using putty.

* * * * *